US 11,895,161 B2

(12) United States Patent
Grover et al.

(10) Patent No.: US 11,895,161 B2
(45) Date of Patent: *Feb. 6, 2024

(54) METHODS, SYSTEMS, AND COMPUTER READABLE MEDIA FOR ROUTING OF PACKETS FOR LAWFUL INTERCEPTION

(71) Applicant: Oracle International Corporation, Redwood Shores, CA (US)

(72) Inventors: Lalit Grover, Haryana (IN); Jayesh Shrimali, Telangana (IN); Vimal Chandra Tewari, Bangalore (IN)

(73) Assignee: ORACLE INTERNATIONAL CORPORATION, Redwood Shores (CA)

( * ) Notice: Subject to any disclaimer, the term of this patent is extended or adjusted under 35 U.S.C. 154(b) by 118 days.

This patent is subject to a terminal disclaimer.

(21) Appl. No.: 17/848,750

(22) Filed: Jun. 24, 2022

(65) Prior Publication Data
US 2022/0329633 A1   Oct. 13, 2022

Related U.S. Application Data

(63) Continuation of application No. 17/006,800, filed on Aug. 29, 2020, now Pat. No. 11,463,484.

(51) Int. Cl.
*H04L 9/40* (2022.01)
*H04L 65/1066* (2022.01)
(Continued)

(52) U.S. Cl.
CPC ........ *H04L 63/306* (2013.01); *H04L 65/1066* (2013.01); *H04L 65/1104* (2022.05); *H04L 67/146* (2013.01)

(58) Field of Classification Search
CPC ....... H04L 63/30; H04L 63/306; H04W 12/80
See application file for complete search history.

(56) References Cited

U.S. PATENT DOCUMENTS

| 6,901,262 B2 | 5/2005 | Allison et al. |
| 6,987,849 B2 | 1/2006 | Ravishankar |

(Continued)

FOREIGN PATENT DOCUMENTS

WO    WO 2022/046169 A1    3/2022

OTHER PUBLICATIONS

Advisory Action and Examiner-Initiated Interview Summary for U.S. Appl. No. 17/006,800 (dated May 11, 2022).

(Continued)

*Primary Examiner* — Khaled M Kassim
*Assistant Examiner* — Najeeb Ansari
(74) *Attorney, Agent, or Firm* — Jenkins, Taylor & Hunt, P.A.

(57) ABSTRACT

Methods, systems, and computer readable media for routing of packets for lawful interception (LI). A system includes at least one session border controller (SBC) configured for forwarding media streams to a forwarding function. The system includes the forwarding function, implemented on a centralized node for a telecommunications network. The forwarding function is configured for receiving the media streams and forwarding each media stream to a respective lawful intercept mediation server for at least one country associated with the media stream. The forwarding function is configured for, in response to receiving a first packet of a first media stream from the SBC, performing a destination lookup for the first media stream and sending a mediation server identifier for the first media stream to the SBC. The SBC can be configured for sending a session release indicator and a direction flag to the forwarding function.

20 Claims, 4 Drawing Sheets

(51) Int. Cl.
*H04L 67/146* (2022.01)
*H04L 65/1104* (2022.01)

(56) References Cited

U.S. PATENT DOCUMENTS

| | | | |
|---|---|---|---|
| 7,123,710 | B2 | 10/2006 | Ravishankar |
| 7,912,486 | B2 | 3/2011 | Bantukul et al. |
| 8,149,725 | B2 | 4/2012 | Lipps et al. |
| 8,499,082 | B2 | 7/2013 | Roach et al. |
| 8,613,073 | B2 | 12/2013 | McCann et al. |
| 8,640,188 | B2 | 1/2014 | Riley et al. |
| 8,750,126 | B2 | 6/2014 | McCann et al. |
| 8,750,825 | B2 | 6/2014 | Patterson et al. |
| 8,813,168 | B2 | 8/2014 | Riley et al. |
| 8,893,248 | B2 | 11/2014 | Roach et al. |
| 8,909,266 | B2 | 12/2014 | Nooren |
| 8,958,306 | B2 | 2/2015 | McCann et al. |
| 9,106,769 | B2 | 8/2015 | Kanode et al. |
| 9,591,556 | B2 | 3/2017 | Ventimiglia et al. |
| 9,647,986 | B2 | 5/2017 | McCann et al. |
| 11,463,484 | B2 | 10/2022 | Grover |
| 2009/0074156 | A1 | 3/2009 | Ku et al. |
| 2009/0141883 | A1* | 6/2009 | Bastien ............... H04L 65/1083 379/213.01 |
| 2009/0232128 | A1 | 9/2009 | Paulis et al. |
| 2011/0141947 | A1 | 6/2011 | Li et al. |
| 2011/0149808 | A1 | 6/2011 | Yared |
| 2012/0254403 | A1* | 10/2012 | Imbimbo ............... H04L 65/103 709/224 |
| 2019/0313234 | A1 | 10/2019 | Liu |
| 2022/0070226 | A1 | 3/2022 | Grover |
| 2022/0321609 | A1 | 10/2022 | Grover et al. |

OTHER PUBLICATIONS

Applicant-Initiated Interview Summary for U.S. Appl. No. 17/006,800 (dated Mar. 3, 2022).
Final Office Action for U.S. Appl. No. 17/006,800 (dated Feb. 17, 2022).
Non-Final Office Action for U.S. Appl. No. 17/006,800 (dated Oct. 28, 2021).
Notification of Transmittal of the International Search Report and the Written Opinion of the International Searching Authority, or the Declaration for International Application No. PCT/US2021/020117 (dated May 28, 2021).
Yang et al., "Implementation and Performance for Lawful Intercept of VoIP calls based on SIP Session Border Controller," 2010 10th IEEE International Conference on Computer and Information Technology (CIT 2010), pp. 1-8 (2010).
"Lawful Interception (LI); Interception domain Architecture for IP networks," ETSI TR 102 528, V1.1.1, pp. 1-38 (Oct. 2006).
Notice of Allowance and Examiner-Initiated Interview Summary for U.S. Appl. No. 17/848,742 (dated Nov. 13, 2023).

* cited by examiner

METHODS, SYSTEMS, AND COMPUTER READABLE MEDIA FOR ROUTING OF PACKETS FOR LAWFUL INTERCEPTION

PRIORITY CLAIM

This application is a continuation of U.S. patent application Ser. No. 17/006,800, filed Aug. 29, 2020, the disclosure of which is incorporated herein by reference in its entirety.

TECHNICAL FIELD

The subject matter described herein relates to methods and systems for routing of packets for lawful interception (LI). More particularly, the subject matter described herein relates to methods, systems, and computer readable media for routing of packets for LI in centralized networks.

BACKGROUND

Some telecommunications network operators deploy centralized networks to offer session based communication services over IP (voice or multimedia) to users from multiple countries. These networks can use Session Border Controllers (SBCs) that usually sit between two service provider networks (i.e. interconnect/peering SBCs), or between an access network and a backbone network (i.e. access SBCs) to provide services to residential and/or enterprise customers. These SBCs are typically deployed at the border between two voice over IP (VoIP) networks, and hence can be a good location to implement a lawful intercept solution.

Enabling lawful interception in the centralized networks can require provisioning of warrants (legally permitted interception targets and associated rules) on access Session Border Controllers deployed outside the respective country. There are regulatory requirements in some countries that prohibit this practice since warrants are considered sensitive information.

Accordingly, there exists a need for methods, systems, and computer readable media for routing of packets for LI in centralized networks.

SUMMARY

Methods, systems, and computer readable media for routing of packets for lawful interception. In one aspect, a system includes at least one session border controller (SBC), wherein the at least one SBC is configured for forwarding a plurality of media streams to a forwarding function. The system includes the forwarding function, implemented on a centralized node for a telecommunications network, the centralized node comprising one or more processors. The forwarding function is configured for receiving the plurality of media streams and forwarding each media stream to a respective lawful intercept mediation server for at least one country associated with the media stream.

The forwarding function is configured for, in response to receiving a first packet of a first media stream from the at least one SBC, performing a destination lookup for the first media stream and sending a mediation server identifier for the first media stream to the at least one SBC. The at least one SBC is configured for storing the mediation server identifier and sending the mediation server identifier to the forwarding function with each subsequent packet of a plurality of subsequent packets for the first media stream.

In some examples, the forwarding function is configured for, in response to receiving the subsequent packets, using the mediation server identifier to route each subsequent packet of the subsequent packets to a first lawful intercept mediation server identified by the mediation server identifier. The at least one SBC can be configured for sending, with the first packet and the subsequent packets of the first media stream, a first correlation identifier for the first media stream.

The forwarding function can be configured for associating the first correlation identifier for the first media stream to the mediation server identifier in a mapping of correlation identifiers to the lawful intercept mediation servers. The forwarding function can be configured for, in response to receiving a second packet including a second correlation identifier and lacking a mediation server identifier, using the mapping of correlation identifiers to route the second packet to a second lawful intercept mediation server associated with the second correlation identifier in the mapping of correlation identifiers.

In some examples, the first packet of the first media stream is a signaling packet establishing the first media stream and each subsequent packet of the subsequent packets is a media packet. In general, subsequent packets can either be signaling or media packets. In some examples, the at least one SBC is an access SBC configured for providing access to a telecommunications service provider access network.

In another aspect, a system includes at least one session border controller (SBC), wherein the at least one SBC is configured for forwarding a plurality of media streams to a forwarding function. The system includes the forwarding function, implemented on a centralized node for a telecommunications network, the centralized node comprising one or more processors. The forwarding function is configured for receiving the plurality of media streams and forwarding each media stream to a respective lawful intercept mediation server for at least one country associated with the media stream.

The at least one SBC is configured for sending, with a first packet and a plurality of subsequent packets of a first media stream, a first correlation identifier for the first media stream.

The forwarding function is configured for, in response to receiving the first packet, performing a destination lookup for the first media stream and associating the first correlation identifier for the first media stream to a mediation server identifier in a mapping of correlation identifiers to the lawful intercept mediation servers. The at least one SBC is configured for sending a second packet of the first media stream with a session release indicator to the forwarding function in response to determining that the first media stream is terminating.

In some examples, the forwarding function is configured for receiving the session release indicator and, in response to receiving the session release indicator, deleting an association between the first correlation identifier for the first media stream and the mediation server identifier in the mapping of correlation identifiers to the lawful intercept mediation servers.

The forwarding function can be configured for, in response to receiving the subsequent packets, using the mediation server identifier to route each subsequent packet of the subsequent packets to a first lawful intercept mediation server identified by the mediation server identifier.

The forwarding function can be configured for, in response to receiving a second packet including a second correlation identifier and lacking a mediation server identifier, using the mapping of correlation identifiers to route the second packet to a second lawful intercept mediation server associated with the second correlation identifier in the mapping of correlation identifiers.

In some examples, the first packet of the first media stream is a signaling packet establishing the first media stream and wherein each subsequent packet of the subsequent packets is a media packet. In some examples, the at least one SBC is an access SBC configured for providing access to a telecommunications service provider access network.

In another aspect, a system includes at least one session border controller (SBC), wherein the at least one SBC is configured for forwarding a plurality of media streams to a forwarding function. The system includes the forwarding function, implemented on a centralized node for a telecommunications network, the centralized node comprising one or more processors. The forwarding function is configured for receiving the plurality of media streams and forwarding each media stream to a respective lawful intercept mediation server for at least one country associated with the media stream.

The at least one SBC is configured for sending, with a first packet of a first media stream, a first direction indicator to the forwarding function, the first direction indicator specifying whether first packet is an inbound initial request or an outbound initial request. The forwarding function is configured for, in response to receiving the first packet, performing a destination lookup for the first media stream using the first direction indicator.

In some examples, the forwarding function is configured for performing the destination lookup using an originating user identity for the first packet in response to determining that the first direction indicator specifies an inbound initial request. The forwarding function can be configured for performing the destination lookup using a terminating user identity for the first packet in response to determining that the first direction indicator specifies an outbound initial request.

The at least one SBC can be configured for sending, with the first packet and a plurality of subsequent packets of a first media stream, a first correlation identifier for the first media stream.

The forwarding function can be configured for, in response to receiving the first packet, associating the first correlation identifier for the first media stream to a mediation server identifier in a mapping of correlation identifiers to the lawful intercept mediation servers. The forwarding function is configured for, in response to receiving the subsequent packets, using the mediation server identifier to route each subsequent packet of the subsequent packets to a first lawful intercept mediation server identified by the mediation server identifier.

In some examples, the first packet of the first media stream is a signaling packet establishing the first media stream and each subsequent packet of the subsequent packets is a media packet. In general, subsequent packets can either be signaling or media packets.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps.

Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
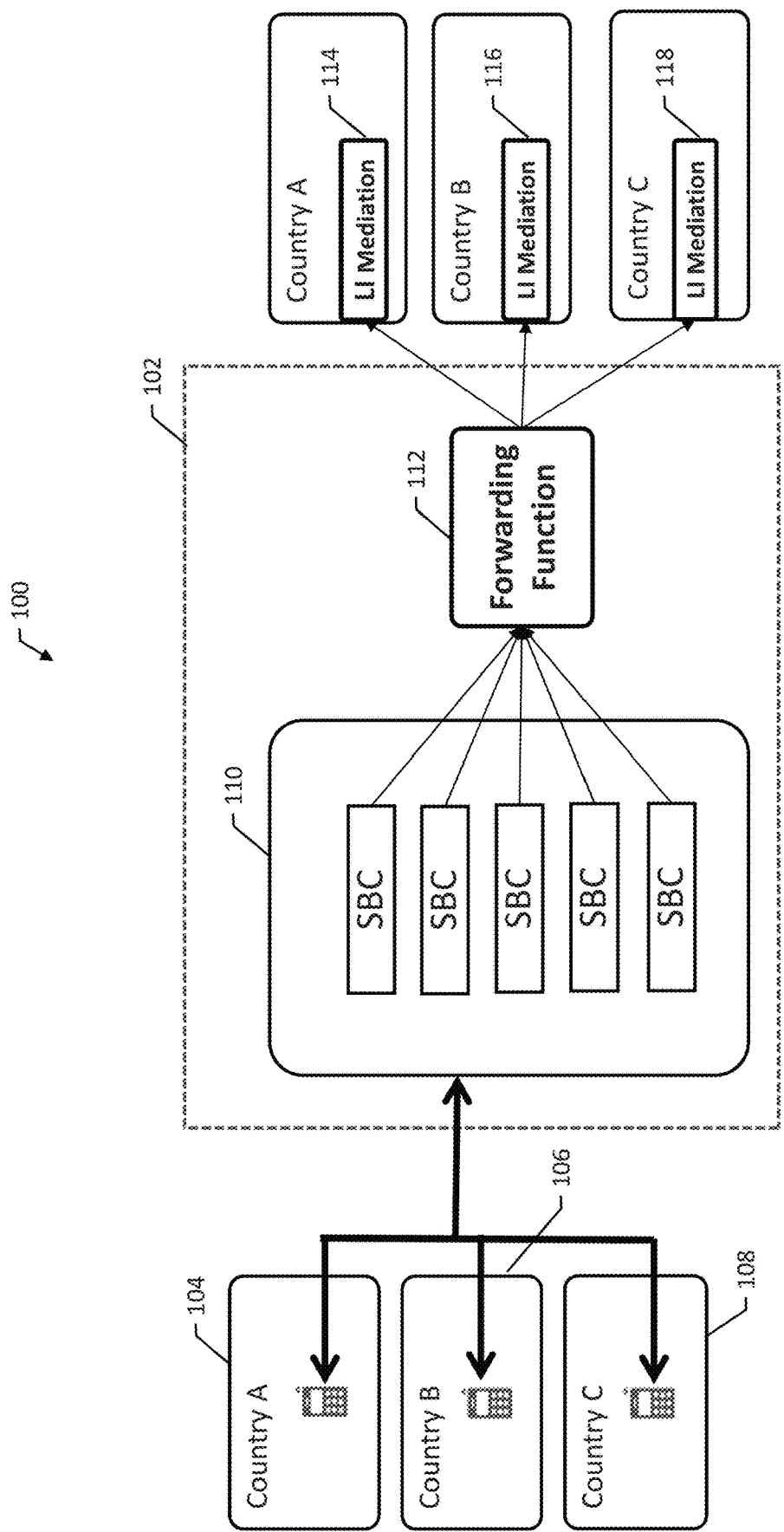
FIG. 1 is a block diagram of an example network environment for routing of packets for lawful interception.

Telecommunications network equipment providers can enhance network nodes (e.g., SBCs) so as to replicate signaling (e.g., SIP) and media (e.g. RTP, MSRP) traffic passing through them to LI mediation servers (hereinafter referred to as LI-MS) deployed in the respective countries, i.e., the countries of the originating/calling and terminating/called users. This allows warrants to stay within each country's network, and thus they can easily be controlled and administered locally by each country's Law enforcement agencies (LEA).

The module/function that is responsible for forwarding these packets to each country's LI-MS is hereinafter referred to as a Forwarding Function (FF). The FF would typically require destination and route lookup rules to be provisioned so as to determine the destination country (and its LI-MS) based on the originating/terminating user identities from the signaling packets.

The centralized network typically comprises of hundreds of access/interconnect SBCs (which can be referred to as Replication Nodes or RN), and can cater to tens of countries. Implementing FF on the RNs would require the routing rules to be configured and maintained on all these nodes, besides having to manage too many connections.

It can therefore be useful to deploy a separate and dedicated network node, a centralized FF that terminates packets from all the Replication nodes, and forwards them to the respective country's LI-MS, even if it means additional traffic between RNs and FF.

In this approach, RNs embed the original signaling and media packets into outer packets sent to FF. The FF, in turn, performs a destination lookup for each session and forwards all packets in that session to an LI-MS. This RN-FF interface can use any proprietary or standard protocol such as Diameter, SIP, or IPFIX (Internet Protocol Flow Information Export).

There would typically be a single connection/stream (one each for signaling and media) from each RN to FF, carrying all the replicated signaling and media packets from multiple connections/streams on that RN.

In the centralized FF approach, a challenge is to correlate the signaling and media streams on FF for all the traffic from all the RNs. The correlation is required since the media packets typically lack the required information to perform a destination lookup. They have to be routed towards an LI-MS that has previously been determined for the signaling packets that established the session to which these media packets belong.

The FF can be configured to handle the embedded signaling packets, and also maintain information about all the replicated signaling and media streams so it can correlate the two. In some examples, the FF can also send a correlation ID along with each signaling and media packet from RN to FF.

RNs (e.g., SBCs) in some examples store this correlation and hence the additional overhead to also send this information may be minimal. The correlation ID along with the RN identity can uniquely identify a replicated stream on the FF.

This allows the FF to create and maintain an association/mapping between Correlation ID (uniquely identifying a particular stream/dialog) and a destination route towards the corresponding LI-MS. The mapping is created when the first signaling packet for a new session arrives at the FF.

Although this approach saves FF from parsing all packets in a session and performing the destination lookup, it still needs the FF to perform a lookup in the Correlation ID→LI-MS map. This could be a per-RN map or a global map if the Correlation ID is globally unique across all RNs. Since the FF is required to handle traffic from hundreds of RNs, each hosting millions of subscribers, it could easily become the bottleneck.

The systems described in this specification can improve the system architecture described above using one or more of the following three features:

1) Improved Forwarding Logic at FF

This feature is realized by:

Sending back an LI-MS identifier (MS-ID) from FF to RNs after destination lookup is performed for the first packet of a new dialog; and Storing this MS-ID at a replication node or an access SBC (A-SBC) and sending it along with Correlation ID in each subsequent packet for that session towards FF.

Upon the arrival of a packet, the FF would look for the presence of MS-ID in the outer packet (e.g. IPFIX). If it is present, the packet can be directly forwarded towards the relevant LI-MS without having to do the Correlation ID lookup or parsing the embedded packet. Any packets that arrive at FF without the MS-ID can fall back to Correlation ID lookup.

2) Improved Cleanup of CorrelationID→MS-ID Mapping

The FF would typically be configured to determine dialog terminations (e.g. SIP BYE/CANCEL) so it can remove the Correlation ID→MS-ID association/mapping. This can potentially require parsing of all the signaling packets which will be an additional overhead for FF that has to handle millions of packets/sec from all RNs.

This feature can relieve this burden by sending a 'SessionRelease' flag as additional metadata with every packet from RNs to FF. RNs already track the sessions and hence, have this information available while replicating packets to FF. The FFs then only need to keep a watch on this flag in the outer packet instead of parsing every 'embedded' signaling packet, thus saving a lot of CPU cycles.

3) Prevent Unnecessary Replication when the Originating and Recipient Users are from Different Countries Some network nodes (e.g., SBCs) maintain two separate legs for every session, i.e., one with the client and the other with the server. These are also referred to as client and server dialogs.

In case of call forking, there could be more than one dialog with the server. The packets that come to these SBCs (or any other proxy nodes) are, at times, expected to be modified before they are sent out on the other side. It is therefore useful to separately replicate packets from all the dialogs of a session.

In the centralized LI architecture, if the originating and terminating users of a session are from different countries, the originating country would be interested in packets coming from or going towards their users, and would prefer not to receive the packets going towards or coming from the terminating user.

The features described in this section would enable the FF to selectively look up and determine an MS-ID for different dialogs of the same session by having RNs also send a 'Direction' flag to FF. The 'Direction (ingress/egress)' flag with signaling packets that establish a new dialog (e.g. SIP INVITE) helps the FF to determine whether the packet belongs to an ingress or egress leg of the call at RN, and accordingly use the calling or called user identity (e.g. SIP FROM/TO header) for destination lookup.

This way, the FF associates different countries (or MS-IDs) to different dialogs of the same session thereby replicating the packets from only the relevant dialog to each country's LI-MS. In the absence of this flag, the FF could still prevent unnecessary replication but only when both the originating and terminating users belong to the same country. The proposed flag helps achieve it even when the users are from different countries.

FIG. 1 is a block diagram of an example network environment 100 for routing of packets for lawful interception. Network environment 100 includes a centralized telecommunications network 102 providing telecommunications services for a number of different networks 104, 106, and 108 in different countries. Centralized telecommunications network 102 includes a number of Session Border Controllers (SBCs) 110 and a forwarding function 112. Forwarding function 112 is implemented on a centralized computing node having one or more processors.

In general, an SBC is a system of one or more computers configured, by virtue of appropriate programming, to control signaling and media streams used in setting up, conducting, and tearing down telephone calls and other types of media communications. For example, SBC can control voice over internet protocol (VoIP) calls.

SBCs can be deployed, in some cases, on a border between two service provider networks in a peering environment, or between a service provider's access network and a backbone network to provide service to the service provider's customers.

SBCs 110 are configured for forwarding media streams, e.g., voice and video calls and other types of media, to forwarding function 112. Forwarding function 112 is configured for receiving the media streams and forwarding each media stream to a respective lawful intercept mediation server (one of servers 114, 116, and 118) for at least one country associated with the media stream. In some examples, forwarding function 112 is implemented as an enhanced SBC.

Centralized telecommunications network 102 can be configured to realize one, two, or three of the three features described above as follows:

1. Improved Forwarding Logic at Forwarding Function 112

In some examples, forwarding function 112 is configured for, in response to receiving a first packet of a first media stream from one of SBCs 110, performing a destination lookup for the first media stream and sending a mediation server identifier for the first media stream to the SBC. The SBC is configured for storing the mediation server identifier and sending the mediation server identifier to forwarding function 112 with each subsequent packet of the first media stream.

In some examples, forwarding function 112 is configured for, in response to receiving the subsequent packets, using the mediation server identifier to route each subsequent packet of the subsequent packets to a first lawful intercept mediation server identified by the mediation server identifier. The SBC can be configured for sending, with the first packet and the subsequent packets of the first media stream, a first correlation identifier for the first media stream. The forwarding function can be configured for associating the first correlation identifier for the first media stream to the mediation server identifier in a mapping of correlation identifiers to the lawful intercept mediation servers. Forwarding function 112 can be configured for, in response to receiving a second packet including a second correlation identifier and lacking a mediation server identifier, using the mapping of correlation identifiers to route the second packet to a second lawful intercept mediation server associated with the second correlation identifier in the mapping of correlation identifiers.

2. Improved Cleanup of CorrelationID→MS-ID Mapping

In some examples, one of SBCs 110 is configured for sending, with a first packet and a number of subsequent packets of a first media stream, a first correlation identifier for the first media stream. Forwarding function 112 is configured for, in response to receiving the first packet, performing a destination lookup for the first media stream and associating the first correlation identifier for the first media stream to a mediation server identifier in a mapping of correlation identifiers to the lawful intercept mediation servers. The SBC is configured for sending a second packet of the first media stream with a session release indicator to the forwarding function in response to determining that the first media stream is terminating.

In some examples, forwarding function 112 is configured for receiving the session release indicator and, in response to receiving the session release indicator, deleting an association between the first correlation identifier for the first media stream and the mediation server identifier in the mapping of correlation identifiers to the lawful intercept mediation servers. Forwarding function 112 can be configured for, in response to receiving the subsequent packets, using the mediation server identifier to route each subsequent packet of the subsequent packets to a first lawful intercept mediation server identified by the mediation server identifier.

Forwarding function 112 can be configured for, in response to receiving a second packet including a second correlation identifier and lacking a mediation server identifier, using the mapping of correlation identifiers to route the second packet to a second lawful intercept mediation server associated with the second correlation identifier in the mapping of correlation identifiers. This could happen, for example, if the second packet is part of the same stream but lacks the mediation server identifier due to an error. In some examples, the second packet is part of a new stream, e.g., the second packet is an initiating packet of a new stream, and forwarding function 112 will not be able to use the mapping of correlation identifiers to route the second packet; instead, forwarding function 112 will perform a destination lookup and create a new association in the mapping for the new stream.

3. Prevent Unnecessary Replication when the Originating and Recipient Users are from Different Countries In some examples, one of SBCs 110 is configured for sending, with a first packet of a first media stream, a first direction indicator to forwarding function 112, the first direction indicator specifying whether first packet is an inbound initial request or an outbound initial request. Forwarding function 112 is configured for, in response to receiving the first packet, performing a destination lookup for the first media stream using the first direction indicator.

In some examples, forwarding function 112 is configured for performing the destination lookup using an originating user identity for the first packet in response to determining that the first direction indicator specifies an inbound initial request. Forwarding function 112 can be configured for performing the destination lookup using a terminating user identity for the first packet in response to determining that the first direction indicator specifies an outbound initial request.

The SBC can be configured for sending, with the first packet and a plurality of subsequent packets of a first media stream, a first correlation identifier for the first media stream. Forwarding function 112 can be configured for, in response to receiving the first packet, associating the first correlation identifier for the first media stream to a mediation server identifier in a mapping of correlation identifiers to the lawful intercept mediation servers. Forwarding function 112 is configured for, in response to receiving the subsequent packets, using the mediation server identifier to route each subsequent packet of the subsequent packets to a first lawful intercept mediation server identified by the mediation server identifier.

In some examples, forwarding function 112 is implemented on an SBC platform or system. The SBC acting as a centralized forwarding function is configured to perform routing of signaling and media packets to a lawful intercept mediation server.

- Signaling packets will be routed based on the routing rules/policies configured at forwarding function 112. These lookups can be done at the host application. In some cases, as described further in this specification, only the first signaling packet of a new session will be routed based on policy lookup at the host. All subsequent signaling packets should also be routed as described further below.
- A module is configured to implement this functionality on the SBC
  - This module should be IPFIX-aware since it will receive/send an IPFIX packet.
  - This module needs to be SIP-aware since it needs to decode SIP headers from the SIP packet embedded within the IPFIX packet, and then perform a lookup.
  - It will also manage the session mappings at platform so as to allow routing of subsequent signaling and/or media packets through the fastpath.
- Routing Rules shall specify the
  - SIP header name to extract the number from (e.g. From, To, Referred-By, Refer-To, R-URI, Diversion Header)
  - Number prefix for lookup
  - Destination ME as next-hop
- In some examples, routing will be based on CGPN for ingress packets (i.e. packets coming to A-SBC) and CDPN for egress packets (i.e. packets going out of A-SBC)

Figure 2:
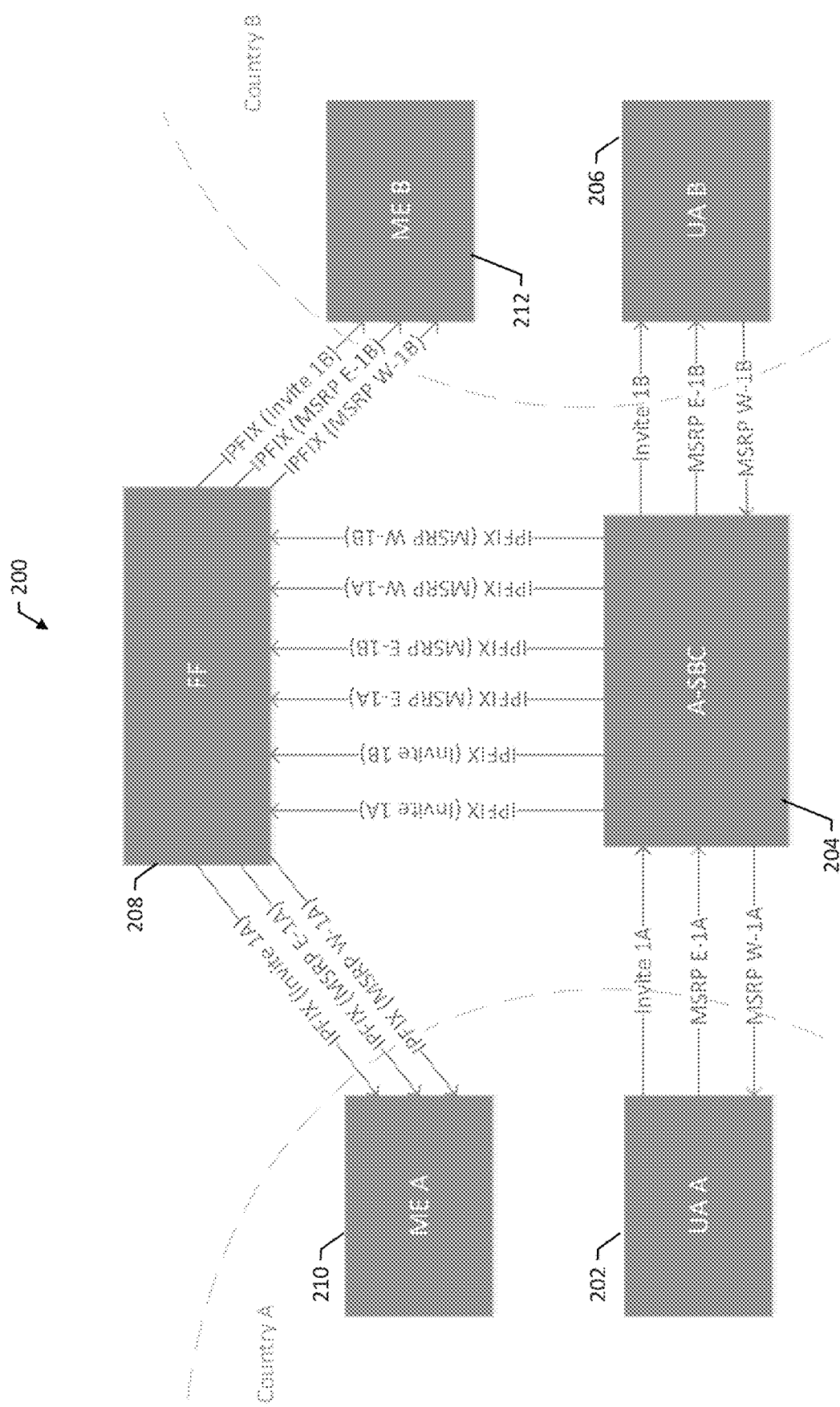
FIG. 2 is a block diagram of an example network environment for establishing lawful intercept of an example call.

FIG. 2 is a block diagram of an example network environment 200 for establishing lawful intercept of an example call.

As shown in FIG. 2, a first user device 202 ("UA A") in country A initiates a call with a second user device 206 ("UA B") in country B via an access SBC 204 (A-SBC). Messages flowing towards country A are labelled as going "west" and messages flowing towards country B are labelled as going "east."

SBC 204 forwards the packets in the media stream of the call to a centralized forwarding function 208. Forwarding function 208 forwards packets sent by user device 202 to a lawful intercept mediation server 210 ("ME A") for country A, and forwarding function 208 forwards packets sent to user device 206 to a lawful intercept mediation server 212 ("ME B") for country B. Although the example of FIG. 2 shows packets going east, the system can operate similarly for packets going west or, in general, in any other direction.

The example shown in FIG. 2 depicts the actions performed at SBC 204 and forwarding function 208 for session initiation protocol (SIP) and message session relay protocol (MSRP).

In a first step, user device 202 sends Invite 1A to SBC 204. SBC 204 performs the following actions:
  Add a unique correlation ID (e.g., randomly generated) to a IPFIX packet and send to forwarding function 208 as IPFIX (Invite 1A).
  While creating media flows, the system will add Correlation ID and "ingress" direction indicator.

In a second step, forwarding function 208 performs the following actions:
  Route lookup based on 'FROM' header (because the direction indicator is ingress) and find the Dest Flow
  Add a mapping for correlation ID (From IPFIX)=>Dest Flow
  Update the ingress media flow (corresponding to the ASBC config) with a new mapping for correlation ID=>Dest Flow In a third step, SBC 204 sends Invite 1B to user device 206 and IPFIX (Invite 1B) to forwarding function 208. SBC 204 performs the following actions:
  Add a unique correlation ID and an 'egress' flag to IPFIX packet and send to the FF In a fourth step, forwarding function 208 performs the following actions:
  Lookup based on 'TO' header and find the Destination Flow
  Add a mapping for correlation ID (from IPFIX)=>Dest Flow
  Update the ingress media flow (corresponding to ASBC config) with a new mapping for correlation ID=>Dest Flow In a fifth step, user device 202 sends MSRP E-1A to SBC 204, and SBC 204 sends MSRP E-1B to user device 206. SBC 204 performs the following actions:
  SBC 204 adds correlation ID to the IPFIX packet and send to FF In a sixth step, SBC 204 sends IPFIX (MSRP E-1A) and IPFIX (MSRP E-1B) to forwarding function 208. Forwarding function 208 performs the following actions:
  Lookup based on correlation ID in the IPFIX to determine the Dest Flow In a seventh step, User device 206 sends MSRP W-1B to SBC 204 and SBC 204 sends MSRP W-1A to user device 202. SBC 204 performs the following actions:
  The system will add correlation ID to the IPFIX packet and send to FF In an eighth step, SBC 204 sends IPFIX (MSRP W-1A) and IPFIX (MSRP W-1B) to forwarding function 208. Forwarding function 208 performs the following actions:
  Lookup based on correlation ID in the IPFIX to determine the Dest Flow FIG. 3 is a block diagram illustrating example packets sent for an example of packet forwarding 300 for lawful interception.

Figure 3:
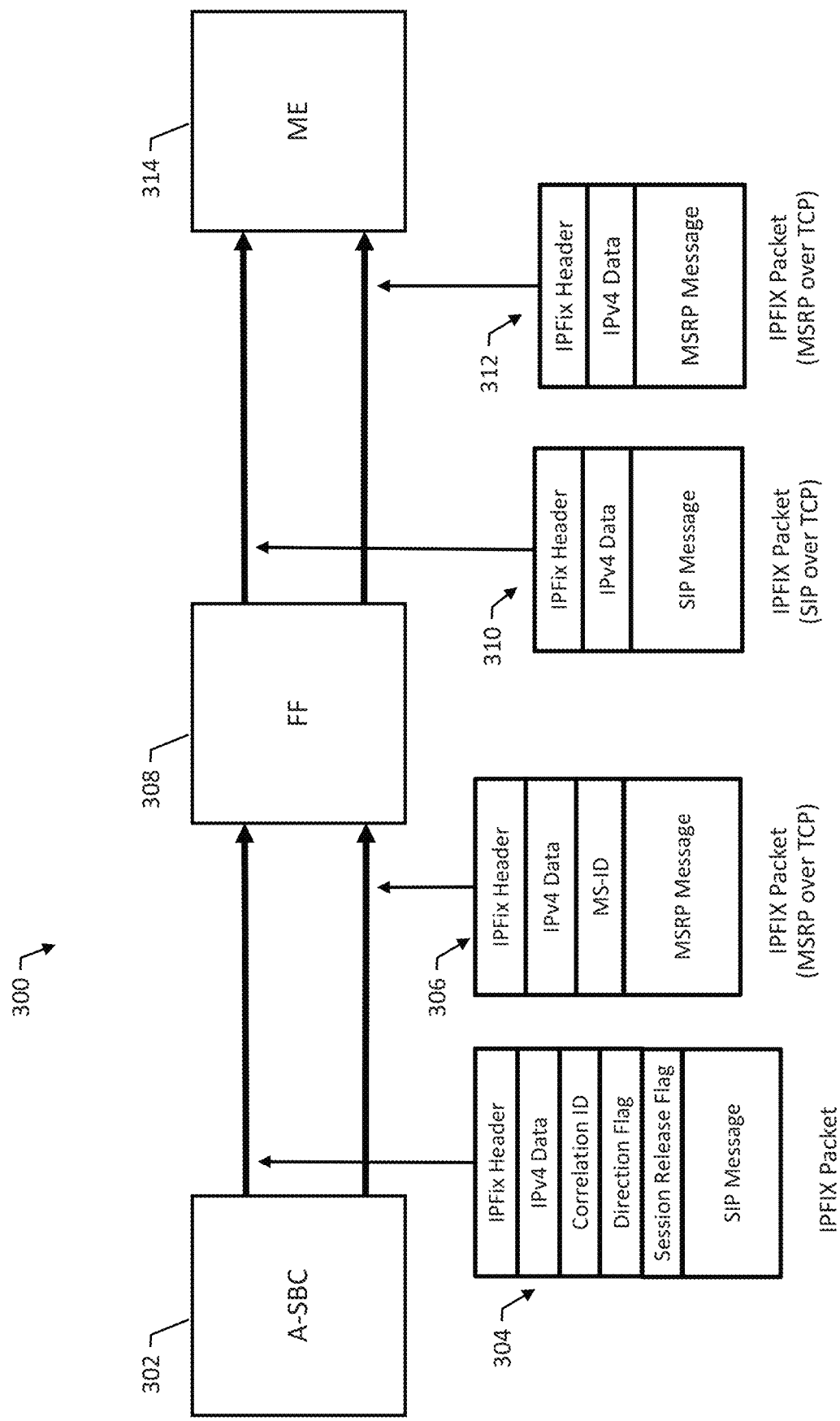
FIG. 3 is a block diagram illustrating example packets sent for an example of packet forwarding for lawful interception.

As shown in FIG. 3, an access SBC 302 forwards a first packet 304 and a subsequent packet 306 to a forwarding function 308. The forwarding function 308 forwards packets 304 and 306 to a lawful intercept mediation server 314 by sending modified packets 310 and 312.

Packet 304 is an IPFIX packet, and in particular, SIP over transmission control protocol (TCP). Packet 304 includes an IPFIX header and IPv4 data. Packet 304 also includes a correlation ID, a direction flag, and a session release flag. Packet 304 includes an SIP message.

Packet 306 is an IPFIX packet, and in particular, MSRP over TCP. Packet 306 includes an IPFIX header and IPv4 data. Packet 306 includes a mediation server identifier, which was stored at SBC 302 after forwarding function 308 performed a destination lookup for packet 304. Packet 306 includes an MSRP message.

When forwarding function 308 receives packet 304 from SBC 302, forwarding function 308 performs a destination lookup to determine that lawful intercept mediation server 314 is the destination for packet 304 and subsequent packets belonging to the same media stream as packet 304, such as packet 306. Forwarding function 308 stores an association between the correlation ID and a mediation server identifier for lawful intercept mediation server 314 in a mapping of correlation identifiers to lawful intercept mediation servers. Forwarding function 308 also sends the mediation server identifier to SBC 302.

Forwarding function 308 generates packet 310 based on packet 304 and sends packet 310 to lawful intercept mediation server 314. Packet 310 is an IPFIX packet, SIP over TCP. Packet 310 includes the IPFIX header, IPv4 data, and SIP message of packet 304. Packet 310 lacks the correlation ID, direction flag, and session release flag of packet 304.

When forwarding function 308 receives packet 306 from SBC 302, forwarding function 308 can avoid checking the mapping of correlation identifiers to lawful intercept mediation servers. Instead, forwarding function 308 uses the mediation server identifier in packet 306 to route packet 306.

Forwarding function 308 generates packet 312 based on packet 306 and sends packet 312 to lawful intercept mediation server 314. Packet 312 is an IPFIX packet, MSRP over TCP. Packet 312 includes the IPFIX header, IPv4 data, and MSRP message of packet 306. Packet 312 lacks the mediation server identifier of packet 306.

In some examples, new set IDs and templates are used to implement the features described in this specification. For example, a common template can be used for replicating both ingress and egress signaling packets at SBC 302.
  "Direction flag" shall indicate whether this is an ingress or egress packet
  Forwarding function 308 shall use this flag to determine which SIP header (for Calling or Called Number) it has to use for routing lookup
  "SessionRelease" flag shall indicate whether call session cleanup is required on FF.

Similarly, a common template can be used for replicating both ingress and egress media packets at SBC 302. The direction flag is not required for MSRP media IPFIX packets since the forwarding function will use the correlation identified to determine a destination lawful intercept mediation server; it will also not need the session release flag.

To facilitate session cleanup at forwarding function 308, forwarding function 308 shall clear/erase the saved dialog information (e.g. correlation ID→Dest Flow mapping) when it receives an IPFIX packet with "SessionRelease" flag set.

In some examples, there is also a timer implemented at forwarding function 308 to clean up the sessions at forwarding function 308 to handle cases when the IPFIX packet, with the "SessionRelease" flag set, gets dropped for some reason.
- This can also happen if the A-SBC reboots in the middle of a session
- The timer shall be cancelled/stopped on receipt of the IPFIX packet with 'SessionRelease' flag set.

Regarding the correlation ID, a unique Correlation (or Replication) ID can be sent from SBC 302 to forwarding function 308. This shall uniquely identify each dialog on SBC 302 or even on forwarding function 308 (e.g., if the ID also includes the A-SBC hostname).
- This is per-Dialog and not per-Session so as to handle the forking scenarios where there can be multiple client dialogs each being replicated to a different country's ME
- There are various options to generate this ID at SBC 302:
- Option 1: Use media-specific information from packets
  - This requires a separate approach for every media type and can be cumbersome to implement.
  - For offer-less INVITEs, this requires parsing of each signaling packet until media info is not received.
- Option 2: Use Media Flow Identifier. At times, this may not be a plausible solution because
  - Media Flow Identifier cannot be used in case of offer-less INVITEs.
  - After switchover of A-SBC, the Media Flow Identifier (locally generated) would change for the same session. So they will need to be replicated
  - When A-SBCs are deployed in standalone mode, mechanism need to be built to ensure that the same ID is not used for a different session across reboots
- Option 3: Use randomly generated unique ReplicationId
  - It will be unique across all A-SBCs and works for offer-less INVITE scenarios as well.

Figure 4:
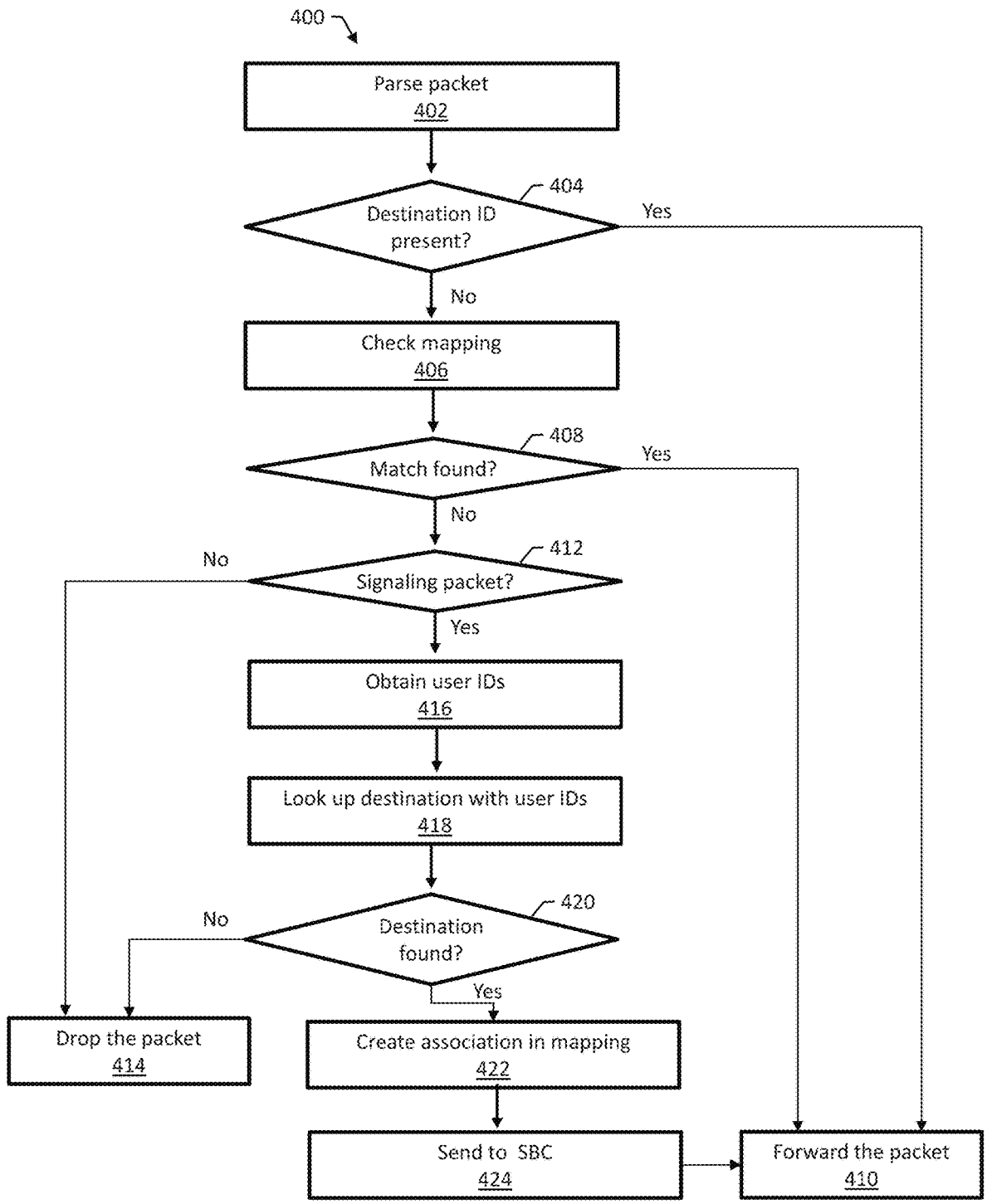
FIG. 4 is a flow diagram of an example method for routing of packets for lawful interception at an example forwarding function.

FIG. 4 is a flow diagram of an example method 400 for routing of packets for lawful interception at an example forwarding function.

Method 400 illustrates improved forwarding logic at the forwarding function, which is realized by:
- Sending back an LI-MS identifier (MS-ID) from the forwarding function to SBCs after destination lookup is performed for the first packet of a new media stream; and
- Storing this MS-ID at A-SBC and sending it along with Correlation ID in each subsequent packet for that media stream towards the forwarding function.

Upon the arrival of a packet, the forwarding function looks for the presence of MS-ID in the outer packet (e.g. IPFIX). If it is present, the packet can be directly forwarded towards the relevant LI-MS without having to do the Correlation ID lookup or parsing the embedded packet. Any packets that arrive at the forwarding function without the MS-ID can fall back to Correlation ID lookup.

Method 400 includes parsing a packet (402) and determining whether a destination identifier (e.g., the MS-ID referred to in other parts of this specification) is present in the packet (404). If the destination identifier is present, then method 400 includes forwarding the packet to a lawful intercept mediation server identified by the destination identifier (410).

If the destination identifier is not found, method 400 includes checking a mapping of correlation identifiers to lawful intercept mediation servers for an entry for a correlation identifier in the packet (406). If a match is found in the mapping of correlation identifiers to lawful intercept mediation servers, then method 400 includes forwarding the packet to a lawful intercept mediation server identified in the entry for the correlation identifier in the packet.

If a match is not found, method 400 includes determining whether or not the packet is a signaling packet, e.g., whether or not the packet is an SIP packet (412). If the packet is not a signaling packet, then method 400 includes dropping the packet (414). If the packet is a signaling packet, method 400 includes obtaining, from the packet, an originating user identity for the packet and a terminating user identity for the packet (416).

Method 400 includes performing a destination lookup in a destination table with one of the user identities as the key (418). The destination table specifies lawful intercept mediation servers for different countries. Method 400 includes determining if a destination lawful intercept mediation server is found (420).

If a destination lawful intercept mediation server is found, method 400 includes creating an association between the correlation identifier for the packet and the destination lawful intercept mediation server in the mapping of correlation identifiers to lawful intercept mediation servers (422), sending a mediation server identifier identifying the destination lawful intercept mediation server to the SBC (424), and forwarding the packet to the destination lawful intercept mediation server (410).

If a destination lawful intercept mediation server is not found, method 400 includes dropping the packet 414.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features.

In particular, with reference to the appended claims, features from dependent claims may be combined with those of the independent claims and features from respective independent claims may be combined in any appropriate manner and not merely in the specific combinations enumerated in the appended claims.

What is claimed is:

1. A system for routing of packets for lawful interception, the system comprising:
   at least one session border controller (SBC), wherein the at least one SBC is configured for forwarding a plurality of media streams to a forwarding function; and
   the forwarding function, implemented on a centralized node for a telecommunications network, the centralized node comprising one or more processors, wherein the forwarding function is configured for receiving the plurality of media streams and forwarding each media stream to a respective lawful intercept mediation server for at least one country associated with the media stream;

wherein the at least one SBC is configured for sending, with a first packet of a first media stream, a first direction indicator to the forwarding function, the first direction indicator specifying whether first packet is an inbound initial request or an outbound initial request;

wherein the forwarding function is configured for, in response to receiving the first packet, performing a destination lookup for the first media stream using the first direction indicator and sending a mediation server identifier for the first media stream to the at least one SBC, wherein the mediation server identifier identifies a first lawful intercept mediation server found by the destination lookup.

2. The system of claim 1, wherein the forwarding function is configured for performing the destination lookup using an originating user identity for the first packet in response to determining that the first direction indicator specifies an inbound initial request.

3. The system of claim 1, wherein the forwarding function is configured for performing the destination lookup using a terminating user identity for the first packet in response to determining that the first direction indicator specifies an outbound initial request.

4. The system of claim 1, wherein the at least one SBC is configured for sending, with the first packet and a plurality of subsequent packets of a first media stream, a first correlation identifier for the first media stream.

5. The system of claim 1, wherein the forwarding function is configured for, in response to receiving the first packet, associating the first correlation identifier for the first media stream to the mediation server identifier in a mapping of correlation identifiers to the lawful intercept mediation servers.

6. The system of claim 1, wherein the forwarding function is configured for, in response to receiving the subsequent packets, using the mediation server identifier to route each subsequent packet of the subsequent packets to a first lawful intercept mediation server identified by the mediation server identifier.

7. The system of claim 1, wherein the first packet of the first media stream is a signaling packet establishing the first media stream and wherein each subsequent packet of the subsequent packets is a media packet.

8. A method for routing of packets for lawful interception, the method comprising:

forwarding, by at least one session border controller (SBC), a plurality of media streams to a forwarding function implemented on a centralized node for a telecommunications network;

receiving, by the forwarding function, the plurality of media streams and forwarding each media stream to a respective lawful intercept mediation server for at least one country associated with the media stream;

sending, by the at least one SBC and with a first packet of a first media stream, a first direction indicator to the forwarding function, the first direction indicator specifying whether first packet is an inbound initial request or an outbound initial request; and performing, by the forwarding function and in response to receiving the first packet, a destination lookup for the first media stream using the first direction indicator and sending a mediation server identifier for the first media stream to the at least one SBC, wherein the mediation server identifier identifies a first lawful intercept mediation server found by the destination lookup.

9. The method of claim 8, wherein performing the destination lookup includes using an originating user identity for the first packet in response to determining that the first direction indicator specifies an inbound initial request.

10. The method of claim 8, wherein performing the destination lookup includes using a terminating user identity for the first packet in response to determining that the first direction indicator specifies an outbound initial request.

11. The method of claim 8, comprising sending, at the at least one SBC and with the first packet and a plurality of subsequent packets of a first media stream, a first correlation identifier for the first media stream.

12. The method of claim 8, comprising associating, at the forwarding function and in response to receiving the first packet, the first correlation identifier for the first media stream to the mediation server identifier in a mapping of correlation identifiers to the lawful intercept mediation servers.

13. The method of claim 8, comprising using, at the forwarding function and in response to receiving the subsequent packets, the mediation server identifier to route each subsequent packet of the subsequent packets to a first lawful intercept mediation server identified by the mediation server identifier.

14. The method of claim 8, wherein the first packet of the first media stream is a signaling packet establishing the first media stream and wherein each subsequent packet of the subsequent packets is a media packet.

15. One or more non-transitory computer readable media having stored thereon executable instructions that when executed by one or more processors of one or more computers control the one or more computers to perform steps comprising:

forwarding, by at least one session border controller (SBC), a plurality of media streams to a forwarding function implemented on a centralized node for a telecommunications network;

receiving, by the forwarding function, the plurality of media streams and forwarding each media stream to a respective lawful intercept mediation server for at least one country associated with the media stream;

sending, by the at least one SBC and with a first packet of a first media stream, a first direction indicator to the forwarding function, the first direction indicator specifying whether first packet is an inbound initial request or an outbound initial request; and performing, by the forwarding function and in response to receiving the first packet, a destination lookup for the first media stream using the first direction indicator and sending a mediation server identifier for the first media stream to the at least one SBC, wherein the mediation server identifier identifies a first lawful intercept mediation server found by the destination lookup.

16. The one or more non-transitory computer readable media of claim 15, wherein performing the destination lookup includes using an originating user identity for the first packet in response to determining that the first direction indicator specifies an inbound initial request.

17. The one or more non-transitory computer readable media of claim 15, wherein performing the destination lookup includes using a terminating user identity for the first packet in response to determining that the first direction indicator specifies an outbound initial request.

18. The one or more non-transitory computer readable media of claim 15 having stored thereon executable instructions that when executed by the one or more processors of the one or more computers cause the one or more computers to send, at the at least one SBC and with the first packet and a plurality of subsequent packets of a first media stream, a first correlation identifier for the first media stream.

19. The one or more non-transitory computer readable media of claim 15 having stored thereon executable instructions that when executed by the one or more processors of the one or more computers cause the one or more computers to associate, at the forwarding function and in response to receiving the first packet, the first correlation identifier for the first media stream to the mediation server identifier in a mapping of correlation identifiers to the lawful intercept mediation servers.

20. The one or more non-transitory computer readable media of claim 15 having stored thereon executable instructions that when executed by the one or more processors of the one or more computers cause the one or more computers to use, at the forwarding function and in response to receiving the subsequent packets, the mediation server identifier to route each subsequent packet of the subsequent packets to a first lawful intercept mediation server identified by the mediation server identifier.

\* \* \* \* \*